June 4, 1968 R. P. GAGLIARDI ETAL 3,387,216
TRIGGERED SPARK GAP ELECTRONIC PROTECTOR
Filed June 18, 1965
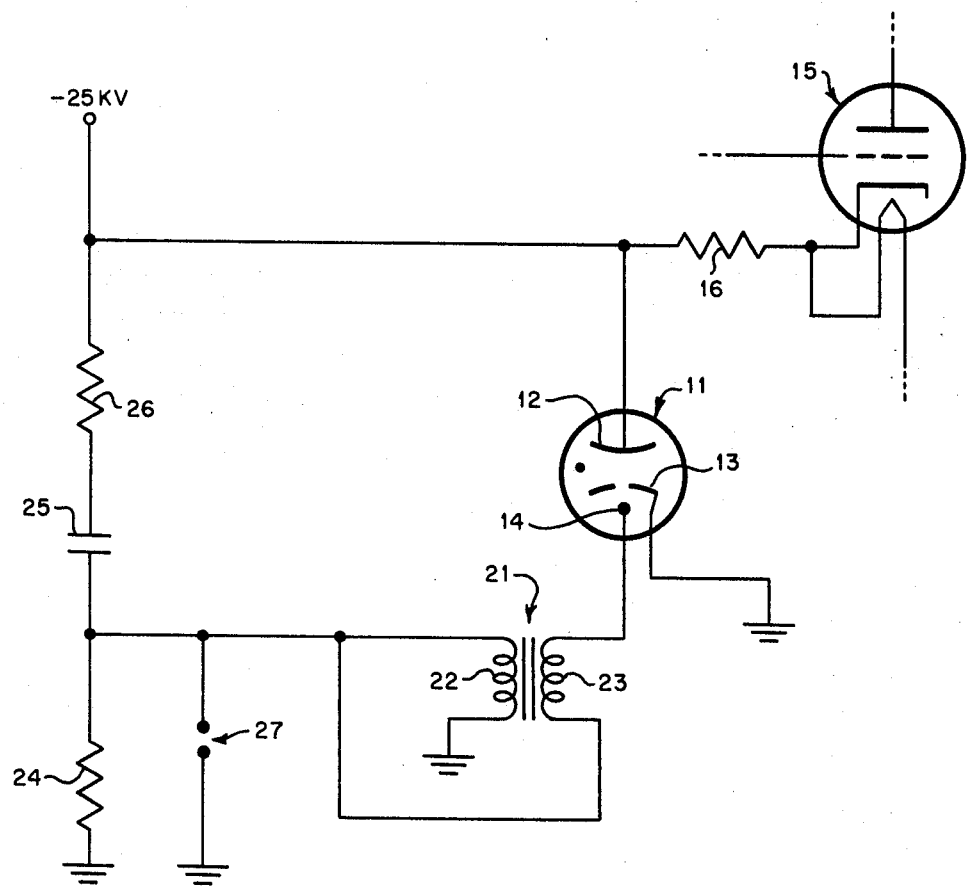
INVENTORS
RICHARD P. GAGLIARDI
LOUIS C. METZ, JR.
BY
ATTORNEYS

United States Patent Office 3,387,216
Patented June 4, 1968

3,387,216
TRIGGERED SPARK GAP ELECTRONIC PROTECTOR
Richard P. Gagliardi, Philadelphia, and Louis C. Metz, Jr., Abington, Pa., assignors to the United States of America as represented by the Secretary of the Navy
Filed June 18, 1965, Ser. No. 465,219
2 Claims. (Cl. 328—8)

ABSTRACT OF THE DISCLOSURE

An apparatus for protecting an electronic load from damage or destruction from internal arcing, employing a normally high impedance discharge device in shunt with the load. The discharge device is triggered into conduction and hence a low impedance condition by a pulse generating circuit which senses an arcing condition in the load and provides a trigger pulse to the discharge device for shunting current from the load through the discharge device until the arcing condition is removed.

---

The invention described herein may be manufactured and used by or for the Government of the United States of America for governmental purposes without the payment of any royalties thereon or therefor.

The present invention relates to a protective device for an electronic circuit and more particularly to a arc preventing device in a traveling wave tube and the like.

In the field of electronic devices such as traveling wave tubes, magnetrons and other high voltage modulating devices, it has been necessary to provide protective devices which sense an arc in the load circuit which might destroy the electronic device by its heating effects. These protective devices then either cut off power to the electronic device in response to the sensing of such an arc or short the power across a shunt circuit to ground. Such shunt or cut-off devices have comprised either relays or thyratrons. Relays have a major disadvantage in that they are relatively slow responding and electronic devices supposedly protected by such relays have been burned out by arcs before the relay could came into operation to protect the device. Thyratrons are faster responding but require a heating circuit to keep their cathodes hot and therefore draw power from the system. In a system using a traveling wave tube or magnetron in which the peak power is high but the duty cycle is low the steady power required by a heating circuit for a thyratron or the like may significantly raise the power requirement for the system as a whole. Moreover, the presence of a hot tube such as a thyratron in a circuit in which heat is already a problem further complicates the problem of dissipation of heat which can destroy sensitive and expensive load devices such as traveling wave tubes or magnetrons. Moreover, the voltages used to pulse devices such as traveling wave tubes or magnetrons run into many thousands of volts and the relatively low voltage necessary to trigger a thyratron is frequently attained in a circuit even though no arcing has occurred, thereby causing the system to shut down at a time when it is unnecessary and, in fact, highly inadvisable.

The general purpose of this invention is to provide a protective circuit for a traveling wave tube and the like which draws no current except when it comes into operation to protect the pulsing device and which can be relied upon to come into operation only when an arc is sensed in the load. To attain this, the present invention utilizes a triggered spark gap triggered by a transformer which is itself driven by a pulse generated by the beginning of an arc in the load device.

Accordingly, it is an object of the present invention to provide a protective device for an electronic circuit using a triggered spark gap which draws no current from the circuit except when the protective device is called into operation.

Another object of the invention is to provide a protective device for an electronic circuit which remains cold in ordinary operation thereby contributing no heat to the circuit.

A further object of the invention is the provision of a protective device for an electronic circuit which comes into operation only upon the sensing of a definite arc in the load device, thereby guarding against premature shut down of the system.

Other objects and many of the attendant advantages of this invention will be readily appreciated as the same becomes better understood by reference to the following detailed description when considered in connection with the accompanying drawing wherein:

The figure shows a circuit diagram of the protective device according to the invention connected to the cathode of an electronic device such as a traveling wave tube.

In the figure there is shown a triggered spark gap 11 having a colt cathode 12, an anode 13 which is linked to ground, and a trigger 14. As indicated, spark gap 11 is gas filled. Spark gap 11 is connected between ground and the cathode of a traveling wave tube 15 through a resistor 16. The spark gap 11 and the cathode of the traveling wave tube 15 are linked to a −15 kilovolt source.

The trigger 14 of spark gap 11 is operated by an auto transformer 21 having a primary 22 and a secondary 23. Transformer 21 has a high secondary to primary turns ratio providing a very high step-up of the pulse voltage which is applied across the primary 22. This primary pulse voltage is generated by the momentary current passing through a resistor 24 linked to the power source through a capacitor 25 and resistor 26. A spark gap 27 similar in its general operation to a spark plug is provided for the protection of the primary 22 of transformer 21.

The operation of the protective device will be apparent from the circuit. The spark gap 11 having a cold cathode 12 has an infinite impedance and draws no current except when it is discharging. In order to discharge it there is required a voltage pulse in the order of +10 kilovolts on trigger 14. In the ordinary operation of traveling wave tube 15 capacitor 25 will charge up to a voltage of −25 kilovolts and no current will pass either through resistors 26 or 24 or the primary 22 of the transformer 21. The voltage across transformer 21 and at trigger 14 will remain substantially at ground, which is not sufficient to cause spark gap 11 to discharge. However, should an arc occur in traveling wave tube 15, the internal impedance of the −25 kilovolt source will cause the voltage at the input to lower somewhat below the −25 kilovolt level for a very short period of time. This will cause the voltage at the top of primary 22 of transformer 21 to go positive somewhat, perhaps in the order of 1000 volts. By the operation of the transformer 21 this voltage is jumped to 10 kilovolts at trigger 14 of spark gap 11. This will cause spark gap 11 to discharge, and since it is gas filled it will continue to arc and discharge until the voltage across it has been substantially lowered. During the discharging process the charge which was charged on capacitor 25 has been discharging through spark gap 11 and the voltage on spark gap 11 and on the cathode of traveling wave tube 15 will go substantially close to zero thereby cutting off the discharge in spark gap 11. For a short time thereafter the voltage on the spark gap 11 will stay low until charge has built up on capacitor 25. During this period the traveling wave tube 15 is allowed to recover from its arc. When capacitor 25 is charged up, traveling wave tube 15 is allowed to continue, unless it is still in an arcing condition, in which case spark gap 11 will be reactivated as soon as the arc in traveling wave tube 15 reappears. When the condition which caused the original arc in traveling wave tube 15 has disappeared, traveling wave tube 15 will resume operation.

As indicated in the drawing, the cathode and anode of spark gap 11 are broad plates capable of carrying a very high current in a discharging condition, up to as much as 5,000 amps. It will be seen therefore that spark gap 11 is capable of discharging the voltage on the traveling wave tube 15 in an extremely short period of time providing therefore a very sharp response to an arcing condition. At the same time since cathode 12 is cold, the spark gap 11 will not respond to momentary fluctuations at trigger 14. Anode 13 is a more or less bowl-like plate with a hole in the center allowing the field generated by trigger 14 to draw electrons from cathode 12. As is well known, as soon as electrons begin to flow across the field of spark gap 11 the gas in the tube is ionized, and its resistance goes substantially to zero.

Although transformer 21 has been shown as an autotransformer, in which the voltage across primary 22 is added to that generated in the secondary 23, this feature is not necessary, since the voltage in primary 22 is small compared with that generated in secondary 23, and an ordinary four terminal transformer may be used instead. The setting of spark gap 27 need only be high enough to protect primary 22 from an overload current.

Obviously many modifications and variations of the present invention are possible in the light of the above teachings. It is therefore to be understood that, within the scope of the appended claims, the invention may be practiced otherwise than as specifically described.

What is claimed is:

1. An anto-arcing protective device for an electronic load comprising:
   a power source having a first terminal connected to supply power to said load and a second terminal connected to ground;
   a cold-cathode triggered spark gap connected to said power source for shunting the flow of power from said load during an arcing condition therein, said spark gap including a gas filled tube having a cathode connected to said first power source terminal, an anode having an aperature therein, said anode connected to said second terminal, and only one trigger electrode, whereby a field generated thereby draws electrons from said cathode through said anode aperture;
   a step up transformer having a primary and a secondary winding, one end of said secondary winding connected to said trigger electrode and the other end connected to one end of said primary winding, the other end of said primary winding connected to ground;
   a first resistor connected at its respective ends to one end of said primary winding and to said second terminal of said power source for sensing a fault in said load; and
   a resistor-capacitor network comprising a second resistor and a capacitor, one end of said second resistor connected to said first power source terminal and the other end connected to one end of said capacitor, the other end of said capacitor connected to one end of said primary winding and one end of said first resistor, whereby an arc in said load is sensed by said first resistor due to a voltage drop therein which causes a voltage pulse from said capacitor to be coupled through said transformer to said trigger electrode to ionize the gas in said tube to shunt the power source to ground.

2. An anti-arcing device as recited in claim 1, further comprising:
   a voltage overload protective device in parallel with said transformer primary.

References Cited

UNITED STATES PATENTS

| | | | |
|---|---|---|---|
| 2,815,446 | 12/1957 | Coombs | 315—91 |
| 2,840,766 | 6/1958 | Wouk | 317—61 |
| 3,206,644 | 9/1965 | Spindle | 317—61 |
| 3,230,459 | 1/1966 | Loya | 328—8 |
| 2,723,371 | 11/1955 | Featherstone | 317—16 |
| 3,254,195 | 5/1966 | Phillips et al. | 315—238 |

JOHN W. HUCKERT, *Primary Examiner.*

JAMES D. KALLAM, *Examiner.*

J. D. CRAIG, *Assistant Examiner.*